US012780482B2

(12) United States Patent
Irving et al.

(10) Patent No.: US 12,780,482 B2
(45) Date of Patent: Nov. 3, 2026

(54) RECYCLED POLYMERIC CONTAINER INCLUDING GRAPHENE

(71) Applicant: AMCOR RIGID PACKAGING USA, LLC, Ann Arbor, MI (US)

(72) Inventors: Mary Irving, East Lansing, MI (US); John Siciliano, Dexter, MI (US); William J. Dubuque, Dexter, MI (US)

(73) Assignee: AMCOR RIGID PACKAGING USA, LLC, Manchester, MI (US)

( * ) Notice: Subject to any disclaimer, the term of this patent is extended or adjusted under 35 U.S.C. 154(b) by 176 days.

(21) Appl. No.: 18/565,901

(22) PCT Filed: Jun. 10, 2021

(86) PCT No.: PCT/US2021/036724

§ 371 (c)(1),
(2) Date: Nov. 30, 2023

(87) PCT Pub. No.: WO2022/260668

PCT Pub. Date: Dec. 15, 2022

(65) Prior Publication Data

US 2024/0262559 A1 Aug. 8, 2024

(51) Int. Cl.
*B65D 1/02* (2006.01)
*B29C 45/00* (2006.01)
(Continued)

(52) U.S. Cl.
CPC ........ *B65D 1/0207* (2013.01); *B29C 45/0001* (2013.01); *B29C 49/0005* (2013.01);
(Continued)

(58) Field of Classification Search
CPC ........................... B65D 1/0207; B65D 79/005; B29C 45/0001; B29C 49/0005; B29C 49/06; B29C 49/10; B29C 49/071; B29C 49/08; B29C 2949/0715; B29C 2949/0862; B29C 2949/22; B29C 2949/24; B29C 2949/26; B29C 2949/28; B29C 2949/3032;
(Continued)

(56) References Cited

U.S. PATENT DOCUMENTS

2004/0101642 A1 5/2004 Quillen et al.
2005/0267285 A1 12/2005 Kulkarni et al.
(Continued)

FOREIGN PATENT DOCUMENTS

CN 103317779 A 9/2013
CN 104845294 A 8/2015
(Continued)

OTHER PUBLICATIONS

Anonymous: "xGnP(R) Graphene Nanoplatelets—Grade R", Internet Citation, Mar. 7, 2018, XP009541733, URL:http://www.pgstars.com/upload/file/201907/1562198925484430.pdf.
(Continued)

*Primary Examiner* — Michael C Miggins
(74) *Attorney, Agent, or Firm* — Harness, Dickey & Pierce, P.L.C.

(57) ABSTRACT

A container for storing product therein. The container is formed by injection stretch blow molding of a preform. The container includes recycled polyethylene terephthalate (PET) and graphene.

25 Claims, 8 Drawing Sheets

(51) Int. Cl.

| | |
|---|---|
| ***B29C 49/00*** | (2006.01) |
| ***B29C 49/06*** | (2006.01) |
| ***B29C 49/10*** | (2006.01) |
| ***B29K 67/00*** | (2006.01) |
| ***B29K 105/16*** | (2006.01) |
| ***B29K 105/26*** | (2006.01) |
| ***B29K 507/04*** | (2006.01) |
| ***B29L 31/00*** | (2006.01) |

(52) U.S. Cl.

CPC .............. *B29C 49/06* (2013.01); *B29C 49/10* (2013.01); *B29K 2067/003* (2013.01); *B29K 2105/162* (2013.01); *B29K 2105/26* (2013.01); *B29K 2507/04* (2013.01); *B29L 2031/712* (2013.01)

(58) Field of Classification Search

CPC ........ B29K 2067/003; B29K 2105/162; B29K 2105/26; B29K 2507/04; B29K 2307/04; B29K 2995/0082; B29K 2995/0096; B29L 2031/712; B29L 2031/7158; B29L 2031/00; C08G 63/183; B29B 7/90; B29B 9/06; B29B 9/12; C08K 3/042; C08L 67/02

See application file for complete search history.

(56) References Cited

U.S. PATENT DOCUMENTS

| | | | | |
|---|---|---|---|---|
| 2006/0255049 | A1 | 11/2006 | McCarthy et al. | |
| 2015/0122766 | A1 | 5/2015 | Hanan | |
| 2015/0298852 | A1 | 10/2015 | Higareda et al. | |
| 2016/0257052 | A1 | 9/2016 | Sun et al. | |
| 2016/0288942 | A1 | 10/2016 | Dygert | |
| 2017/0009046 | A1 | 1/2017 | Hanan et al. | |
| 2017/0218166 | A1 | 8/2017 | Hanan | |
| 2018/0171099 | A1 | 6/2018 | Hanan et al. | |
| 2018/0215881 | A1 | 8/2018 | Hanan et al. | |
| 2018/0273367 | A1 | 9/2018 | Lane | |
| 2020/0308366 | A1 | 10/2020 | Hanan et al. | |
| 2020/0385179 | A1 | 12/2020 | McCourt | |
| 2021/0229853 | A1 | 7/2021 | Dygert et al. | |
| 2021/0340371 | A1* | 11/2021 | Bhat .................... | C08G 63/183 |
| 2023/0007515 | A1 | 1/2023 | Xu et al. | |

FOREIGN PATENT DOCUMENTS

| | | | |
|---|---|---|---|
| CN | 107523049 | A | 12/2017 |
| CN | 108641314 | A | 10/2018 |
| CN | 109206863 | A | 1/2019 |
| CN | 109810349 | A | 5/2019 |
| CN | 110982233 | A | 4/2020 |
| CN | 120623728 | A | 9/2025 |
| EP | 2917011 | B1 | 7/2017 |
| EP | 2235106 | B1 | 11/2018 |
| EP | 3825096 | A1 | 5/2021 |
| JP | 2018108852 | A | 7/2018 |
| JP | 2019064607 | A | 4/2019 |
| KR | 20170090704 | A | 8/2017 |
| WO | 2010086346 | A1 | 8/2010 |
| WO | 2017180629 | A1 | 10/2017 |
| WO | 2019217744 | A1 | 11/2019 |
| WO | WO-2020174391 | A1 | 9/2020 |
| WO | 2020218916 | A1 | 10/2020 |
| WO | 2021035202 | A1 | 2/2021 |
| WO | 2022093554 | A3 | 8/2022 |
| WO | 2022260668 | A1 | 12/2022 |

OTHER PUBLICATIONS

Daver, F. et al., "A simulation study of the effect of preform cooling time in injection stretch blow molding", Feb. 21, 2013, Journal of Materials Processing Technology, pp. 2400-2405, XP028935917, ISSN: 0924-0136.

Extended European Search Report from counterpart EP219453396, dated Dec. 19, 2024.

Product information, "xGnP® Graphene Nanoplatelets—Grade R", XG Sciences Inc., Mar. 2018 <https://xgsciences.com/wp-content/uploads/2018/03/xGnP-R.-MD00008.-2018.pdf>.

International Search Report and Written Opinion issued in International Application No. PCT/US2021/036724, dated Mar. 7, 2022; ISA/KR.

Colombian Office Action from counterpart NC20230018268, dated Aug. 31, 2026, with English machine translation.

Al-Maqdasi Z, et al. (2021). Time-dependent properties of graphene nanplatelets reinforced high-density polyethylene. J Appl Polym Sci. 2021; 138:e50783. https://doi.org/10.1002/app.50783.

Honaker K., et al. (2020). Influence of processing methods on the mechanical and barrier properties of HDPE-GNP nancomposites. Adv Compos Hybrid Mater 4, 492-504. https://doi.org/10.1007/s42114-020-00181-1.

Cabrera G., et al. (2021). Multi-Micro/Nanolayer Films Based on Polyolefins: New Approaches from Eco-Design to Recycling. Polymers, 13(3), 413. https://doi.org/10.3390/polym13030413.

Suresha B., et al. (2020). Role of graphene nanoplatelets and carbon fiber on mechanical properties of PA66/thermoplastic copolyester elastomer composites. Materials Research Express, 7(1), 015325. https://doi.org/10.1088/2053-1591/ab648d.

Mohan Velram, et al. (2020). Mechanical, electrical and thermal performance of hybrid polyethylene-graphene nanplatelets-polypyrrole composites: a comparative analysis of 3D printed and compression molded samples. Polymer-Plastics Technology and Materials, 59(7), 780-796. https://doi.org/10.1080/25740881.2019.1695272.

A. Chaudhry, et al. (2020). Thermal, electrical, and mechanical properties of highly filled HDPE/graphite nanoplatelets composites, Materials Today: Proceedings, vol. 29, Part 4, pp. 704-708, ISSN 2214-7853, https://doi.org/10.1016/j.matpr.2020.04.168.

Esra Ozdemir, et al. (2020). Ethylene methyl acrylate copolymer (EMA) assisted dispersion of few-later graphene nanoplatelets (GNP) in poly(ethylene terephthalate) (PET), Polymer, vol. 205, 122836, ISSN 0032-3861, https://doi.org/10.1016/j.polymer.2020.122836.

Bin Yang, et al. (2019). Melt crystallization and thermal properties of graphene platelets (GNPs) modified recycled polyethylene terephthalete (RPET) composites: The filler network analysis, Polymer Testing, vol. 77, 105869, ISSN 0142-9418, https://doi.org/10.1016/j.polymertesting.2019.04.016.

Shigeru Aoyama, et al. (2019). Higher-Order Structure in Amorphous Poly(ethylene terephthalete)/Graphene Nanocomposites and Its Correlation with Bulk Mechanical Properties. ACS Omega, 4(1), 1228-1237. https://doi.org/10.1021/acsomega.8b03280.

Ghadami A., et al. (2016). A comprehensive study on morphological and rheological behavior of poly(ethylene terephthalate) and poly-(ethylene-2,6-naphthalene) nanocomposite blends in presence of graphen. Journal of Vinyl and Additive Technology, 23(S1). Portico. https://doi.org/10.1002/vnl.21530.

Shigeru Aoyama, et al. (2014). Melt crystallization of poly(ethylene terephthalate): Comparing addition of graphene vs carbon nanotubes, Polymer, vol. 55, Issue 8, pp. 2077-2085, ISSN 0032-3861, https://doi.org/10.1016/j.polymer.2014.02.055.

Czajka Michael, et al. (2017). Hydrogen-Reduced Low-Defect Graphene with Poly(ethylene terephthalate) Composites. Polymer Research Journal. 10, Tomado de.

Inuwa I., et al. (2014). Characterization and mechanical properties of exfoliated graphite nanoplatelets reinforced polyethylene terephthalate/polypropylene composites. Journal of Applied Polymer Science, 131(15). Portico. https://doi.org/10.1002/app.40582.

Alvarado Chacon, et al. (2020). Effect of recycled content and rPET quality on the properties of PET bottles, part I: Optical and mechanical properties. Packag Technol Sci. 33: 347-357. https://doi.org/10.1002/pts.2490.

Tracy Momany. (2018). The Impact of Recycled PET Content on PET Hot-Fill Containers. Plastic Technologies, Inc. Tomado de

(56) References Cited

OTHER PUBLICATIONS internet el 28 de agosto de 2026, de la página: https://www.plastictechnologies.com/wp-content/uploads/2018/07/The-Impact-of-Recycled-PET-Content-on-PET-Hot-Fill-Containers.pdf.
Patuto J., et al. (2007). Recycled Poly (ethylene terephthalate) (PET) Blends for Hot-fill Bottles. Annual Technical Conference—ANTEC, Conference Proceedings. 4.
A. Pegoretti, et al. (2004). Recycled poly(ethylene terephthalate)/layered silicate nanocomposites: morphology and tensile mechanical properties, Polymer, vol. 45, Issue 8, pp. 2751-2759, ISSN 0032-3861, https://doi.org/10.1016/j.polymer.2004.02.015.

* cited by examiner

Container 1: vPET 100%; PCR 0%; Graphene/PET Masterbatch 0%
Container 2: vPET 100%; PCR 0%; Graphene/PET Masterbatch 0.25%
Container 3: vPET 100%; PCR 0%; Graphene/PET Masterbatch 0.1%
Container 4: vPET 50%; PCR 50%; Graphene/PET Masterbatch 0%
Container 5: vPET 50%; PCR 50%; Graphene/PET Masterbatch 0.25%
Container 6: vPET 50%; PCR 50%; Graphene/PET Masterbatch 0.1%

Note: Graphene is 0.1% of Masterbatch

Container 1: vPET 100%; PCR 0%; Graphene/PET Masterbatch 0%
Container 2: vPET 100%; PCR 0%; Graphene/PET Masterbatch 0.25%
Container 3: vPET 100%; PCR 0%; Graphene/PET Masterbatch 0.1%
Container 4: vPET 50%; PCR 50%; Graphene/PET Masterbatch 0%
Container 5: vPET 50%; PCR 50%; Graphene/PET Masterbatch 0.25%
Container 6: vPET 50%; PCR 50%; Graphene/PET Masterbatch 0.1%
Note: Graphene is 0.1% of Masterbatch Container 1: vPET 100%; PCR 0%; Graphene/PET Masterbatch 0%
Container 2: vPET 100%; PCR 0%; Graphene/PET Masterbatch 0.25%
Container 3: vPET 100%; PCR 0%; Graphene/PET Masterbatch 0.1%
Container 4: vPET 50%; PCR 50%; Graphene/PET Masterbatch 0%
Container 5: vPET 50%; PCR 50%; Graphene/PET Masterbatch 0.25%
Container 6: vPET 50%; PCR 50%; Graphene/PET Masterbatch 0.1%
Note: Graphene is 0.1% of Masterbatch

RECYCLED POLYMERIC CONTAINER INCLUDING GRAPHENE

CROSS-REFERENCE TO RELATED APPLICATION

This application is a U.S. National Phase Patent Application under 35 U.S.C. 371 of International Application No. PCT/US2021/036724, filed on Jun. 10, 2021, the entire disclosure of which is incorporated herein by reference.

FIELD

The present disclosure relates to a container made of recycled polymer and graphene.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\%\ \text{Crystallinity} = \left(\frac{\rho - \rho_a}{\rho_c - \rho_c}\right) \times 100$$

where ρ is the density of the PET material; $\rho_a$ is the density of pure amorphous PET material (1.333 g/cc); and pc is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 30%-40%.

While current preforms and containers are suitable for their intended use, they are subject to improvement. The present disclosure provides for improved preforms and containers, which advantageously include recycled content.

SUMMARY

This section provides a general summary of the disclosure, and is not a comprehensive disclosure of its full scope or all of its features.

The present disclosure includes a container for storing product therein. The container is formed by injection stretch blow molding a preform. The container includes recycled polyethylene terephthalate (PET) and graphene.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
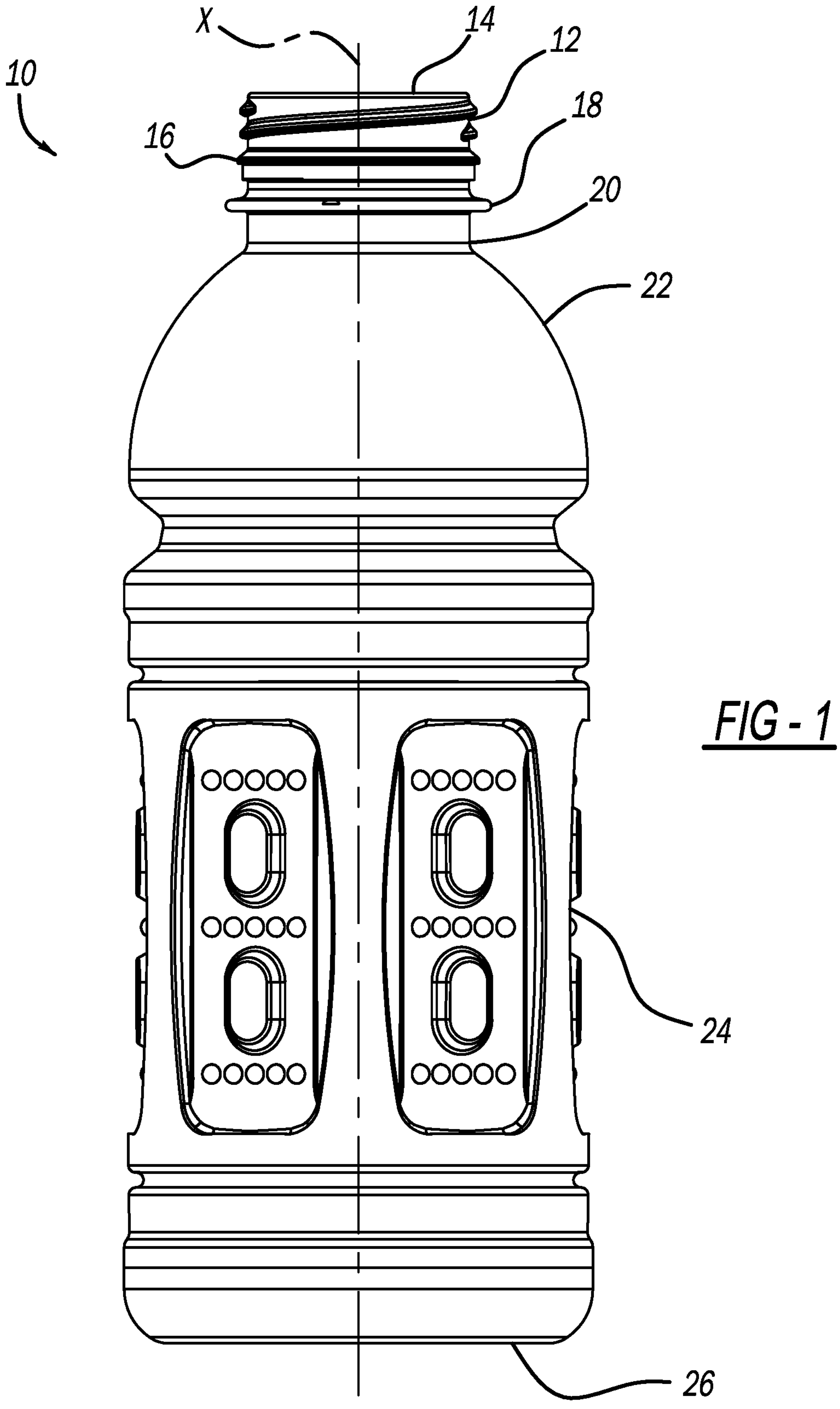
FIG. 1 is a side view of an exemplary container in accordance with the present disclosure.
Figure 2:
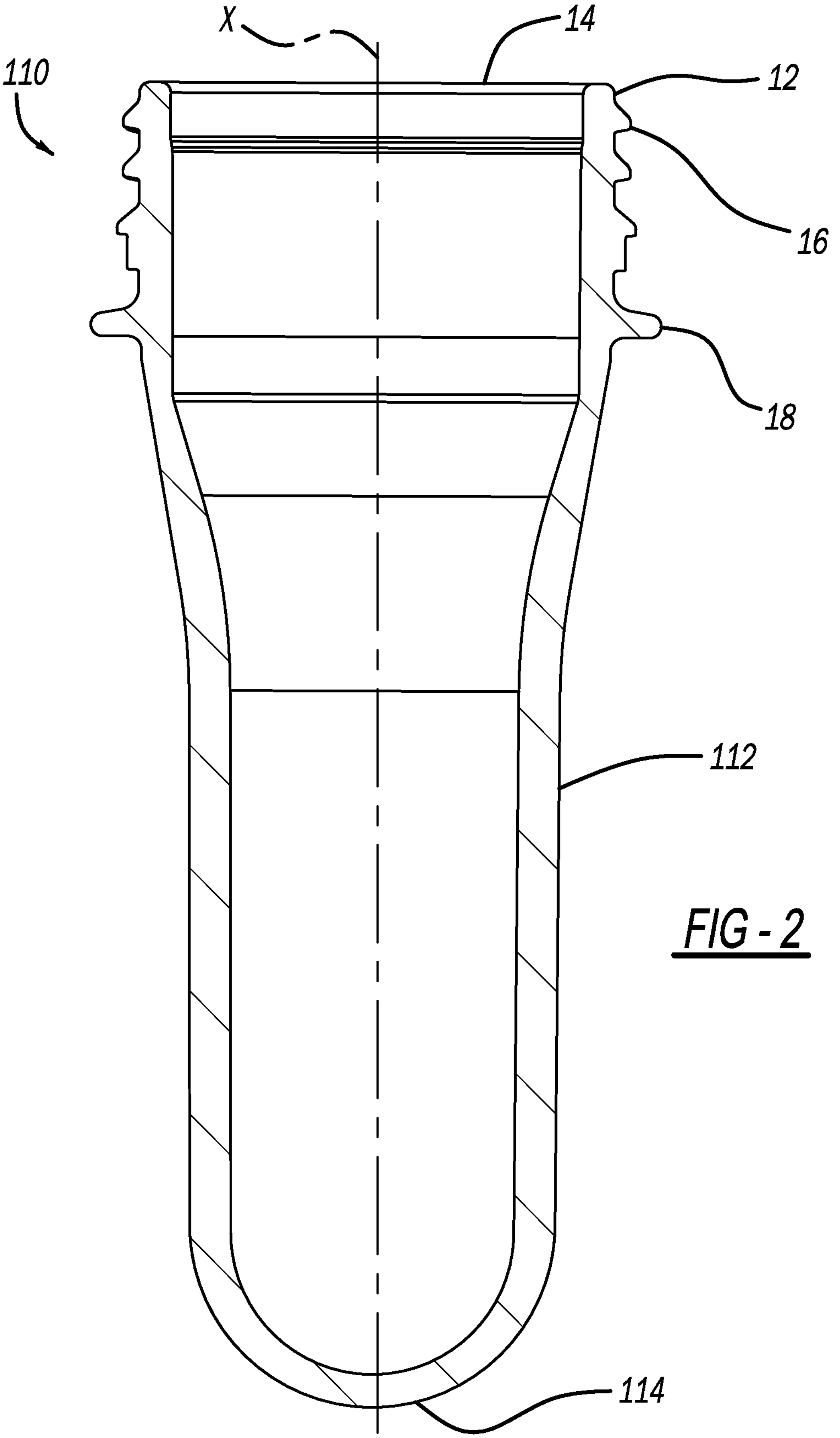
FIG. 2 is a cross-sectional view of an exemplary container preform in accordance with the present disclosure.

FIG. 1 illustrates an exemplary container 10 in accordance with the present disclosure. The container 10 may have any suitable size and shape, and thus the size and shape of the container 10 illustrated in FIG. 1 is for exemplary purposes only. The container 10 may be configured to store any suitable product therein, such as any suitable liquid or foodstuff. The container 10 is formed by injection blow molding from any suitable preform, such as the preform 110 of FIG. 2. The size and shape of the preform 110 will correspond to a desired size and shape of the container 10. The size and shape of the preform 110 of FIG. 2 is provided for exemplary purposes only.

The container 10 includes a finish 12, which defines an opening 14 of the container 10. Extending from an outer surface of the finish 12 are threads 16. The threads 16 are configured to cooperate with any suitable closure for closing the opening 14. The threads 16 are between the opening 14 and a support flange 18, which is configured to support the preform 110 in a mold during blow molding. Below the support flange 18 is a neck 20. Extending from the neck 20 is a shoulder 22. The shoulder 22 extends to a body 24 of the container 10. The body 10 may have any suitable size and shape. In the example illustrated, the body 24 tapers inward towards a longitudinal axis X of the container 10. The body 24 may include ribs or any other suitable vacuum panels to absorb vacuum. The preform 110 includes a body 112, which during blow molding is expanded against a mold having a shape corresponding to the body 24. At a bottom of the container 10 is a base 26, which supports the container 10 upright when the base 26 is seated on a flat surface. The base 26 may be any suitable base, such as a base configured to flex inward during blow molding to absorb vacuum within the container 10. The preform 110 includes a tip 114, which forms the base 26 during blow molding when the tip 114 is blown into a base mold.

The preform 110 is formed by injection molding. The material from which the preform 110 is molded includes a master batch of polyethylene terephthalate (PET) resin mixed with graphene. The master batch may be 0.1% graphene and 99.9% PET resin. The PET resin of the master batch is configured for injection stretch blow molding and may be entirely virgin PET, a mixture of virgin PET and recycled PET, or entirely recycled PET. The PET resin of the master batch may include or be Laser+® HS Ti818 (G51) from DAK Americas LLC of Charlotte, NC. This master batch is then mixed with additional PET resin, all or some of which is recycled PET. The master batch and the additional PET resin is mixed and injected into a mold to mold the preform 110. The preform 110 may include 0.025%-0.5% (or 0.1%-0.35%) of the master batch and the remainder of the preform 110 is the additional PET. Any suitable virgin and recycled polyethylene terephthalate (PET) polymers may be used. Any suitable percentage of the virgin and recycled polymers may be included. For example and apart from the PET of the master batch, up to 75% of the container may be the virgin polymer such as Laser+® HS Ti818 (G51) from DAK Americas LLC of Charlotte, NC., and up to 100% of the container may be the recycled polymer such as Verdeco food-grade rPET.

The preform 110 is then inserted in an injection stretch blow molding machine, which blow molds the container 10 from the preform 110. The resulting container 10 thus includes graphene, the PET from the master batch, and the additional mixture of virgin PET and recycled PET, or entirely recycled PET.

The graphene may be graphene nanoplatelets. Any suitable graphene nanoplatelets may be included. The graphene nanoplatelets may be high purity, low defect, ultra-thin particles of graphite of nanometer scale thickness, and may be provided as short stacks of graphite sheets. The container 10 may include any suitable amount of graphene. For example, 0.025%-0.5% of the container 10 may be the master batch mixture of PET and graphene. Or about 0.1% to 0.35% of the container 10 may be the master batch mixture of PET and graphene. The total amount of graphene in the container 10 may be 0.0025% to 0.05%. Or the total amount of graphene in the container 10 may be 0.01% to 0.035%.

The graphene may have a bulk density of 0.03-0.1 g/cc, an oxygen content of less than 5%, and a residual acid content of less than 0.5 wt. %. The graphene nanoplatelets each have a surface area of 30 to 60 $m^2/g$, and an average particle diameter of one of 7, 10, and 25 microns. The graphene nanoplatelets may each have a density of 2.2 $g/cm^3$, and a loss on ignition of greater than, or equal to, 99.0 wt. %. The graphene nanoplatelets each have a thermal conductivity of 3,000 W/m·K parallel to a surface, and 6 W/m·K perpendicular to the surface. The graphene nanoplatelets may each have a thermal expansion of 4–6*10–6 (m/m/K) parallel to a surface, and 0.5–1.0*10–6 (m/m/K) perpendicular to the surface. The graphene nanoplatelets may each have a tensile modulus of 1,000 MPa and a tensile strength of 5 MPa. With respect to electrical conductivity, the graphene nanoplatelets may each have an electrical conductivity of $10^7$ S/m parallel to a surface and $10^2$ S/m perpendicular to the surface.

As a result of making the container 10 out of PET resin, the container 10 advantageously has good impact resistance, optical clarity and barrier resistance as long as the resin achieves a proper percent crystallinity during production. The container 10 is manufactured using a two-step process, during which the resin is melted and injected into a mold in which the resin assumes the temporary shape of the preform 110. Pressurized air is then introduced into the preform 110, which is then blow molded into the shape of the final container 10. As this occurs, the resin stretches and obtains a level of crystallinity that affects the final properties of the container including optical clarity, gas permeability, impact resistance, stiffness, and resistance to creep. The assessment of a PET's percent crystallinity can be performed using differential scanning calorimetry (DSC). The DSC percent crystallinity is directly related to essential properties including optical clarity, toughness, stiffness, creep, barrier resistance, gas permeability, and long term stability.

The basic building blocks of PET are ethylene glycol and terephthalic acid, which are combined to form a polymer chain. The resulting spaghetti-like strands of PET are extruded, quickly cooled, and cut into small pellets. The resin pellets are then heated to a molten liquid that can be easily extruded or molded into items of practically any shape. PET is completely recyclable, and is the most recycled plastic in the U.S. and worldwide. PET can be commercially recycled by thorough washing and re-melting, or by chemically breaking it down to its component materials to make new PET resin. Almost every municipal recycling program in North America and Europe accepts PET containers. Products commonly made from recycled PET include new PET bottles and jars. Recycled PET is commonly referred to as rPET and PCR.

Post consumer recycled (PCR) resin is the recycled product of waste created by consumers. Post industrial regrind (PIR) is any closed-loop/recaptured scrap resin directly resulting from the manufacturing process, such as the scrap created by the manufacturing process of bottles and closures that is solely recaptured and reworked within the manufacturing plant, including hot-runners, flash, moils, and tails from the molding or extruding process that has gone through at least one molding or extrusion process and is subsequently grounded and reintroduced back into the manufacturing process. Since PCR/PIR regrind material has gone through an initial heat and molding process, it cannot be considered "virgin" material. The physical, chemical and flow properties can differ slightly from virgin material, therefore PCR and PIR is not generally used exclusively to make new bottles or parts, but it is blended with virgin PET. Before PCR and PIR plastic is turned into resin, the materials are processed and cleaned to produce plastic resin pellets. Verdeco food-grade rPET is an example of a suitable resin.

Figure 3:
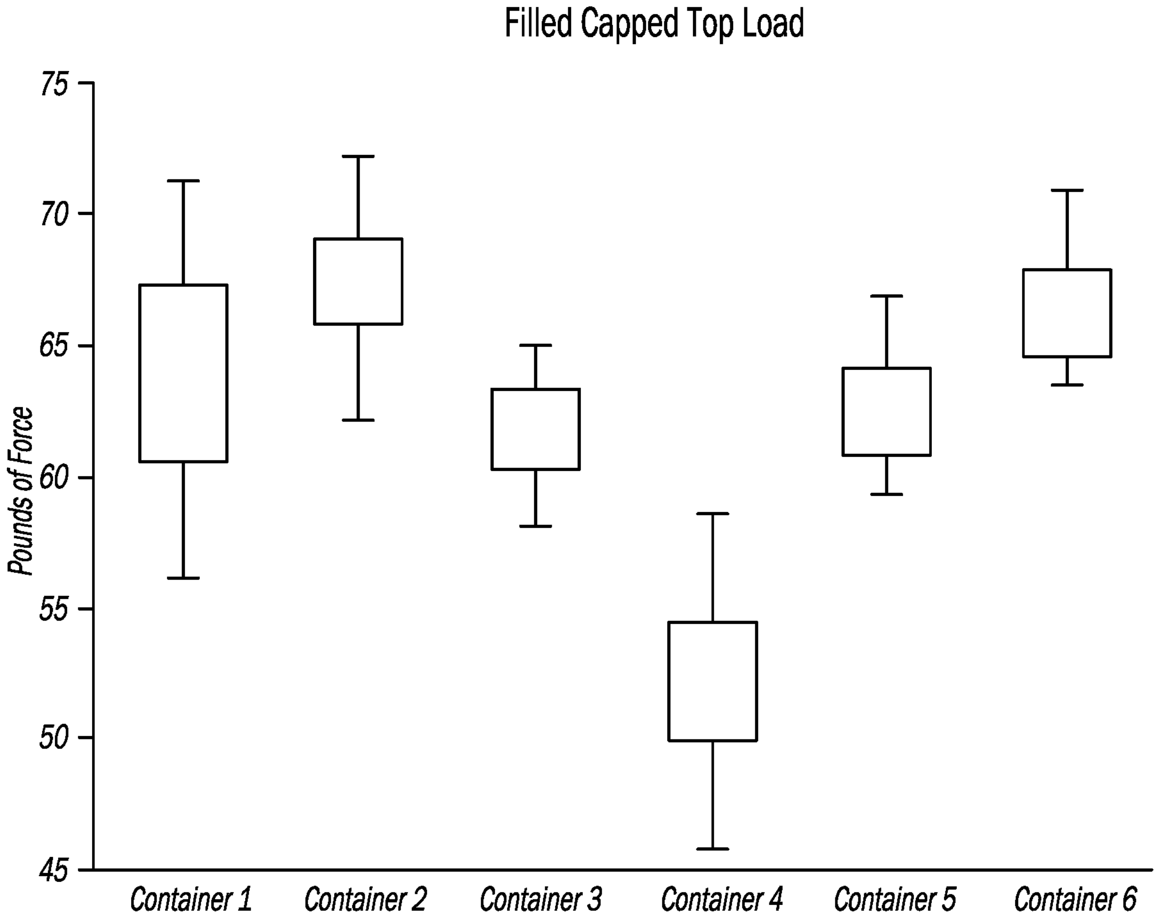
FIG. 3 illustrates performance of various containers during a filled capped top load test.

FIG. 3 illustrates an exemplary filled capped top load test. Vertical bottle samples were evaluated for compression resistance after hot fill while capped post cooling. A compression plate was lowered at a rate of half an inch per minute, and results recorded as pounds of force being applied when the container failed. The test was performed with virgin PET (vPET), and with no rPET and graphene to determine baseline performance. Graphene was also added at 0.25% and at 0.1% to the vPET with minimal effects on performance. Then the virgin PET was mixed with 50% rPET causing a significant drop in top load performance, but by adding 0.25% and 0.1% graphene (as a percentage of the master batch) to the vPET/rPET the performance was increased back to virgin PET (vPET) levels.

Figure 4:
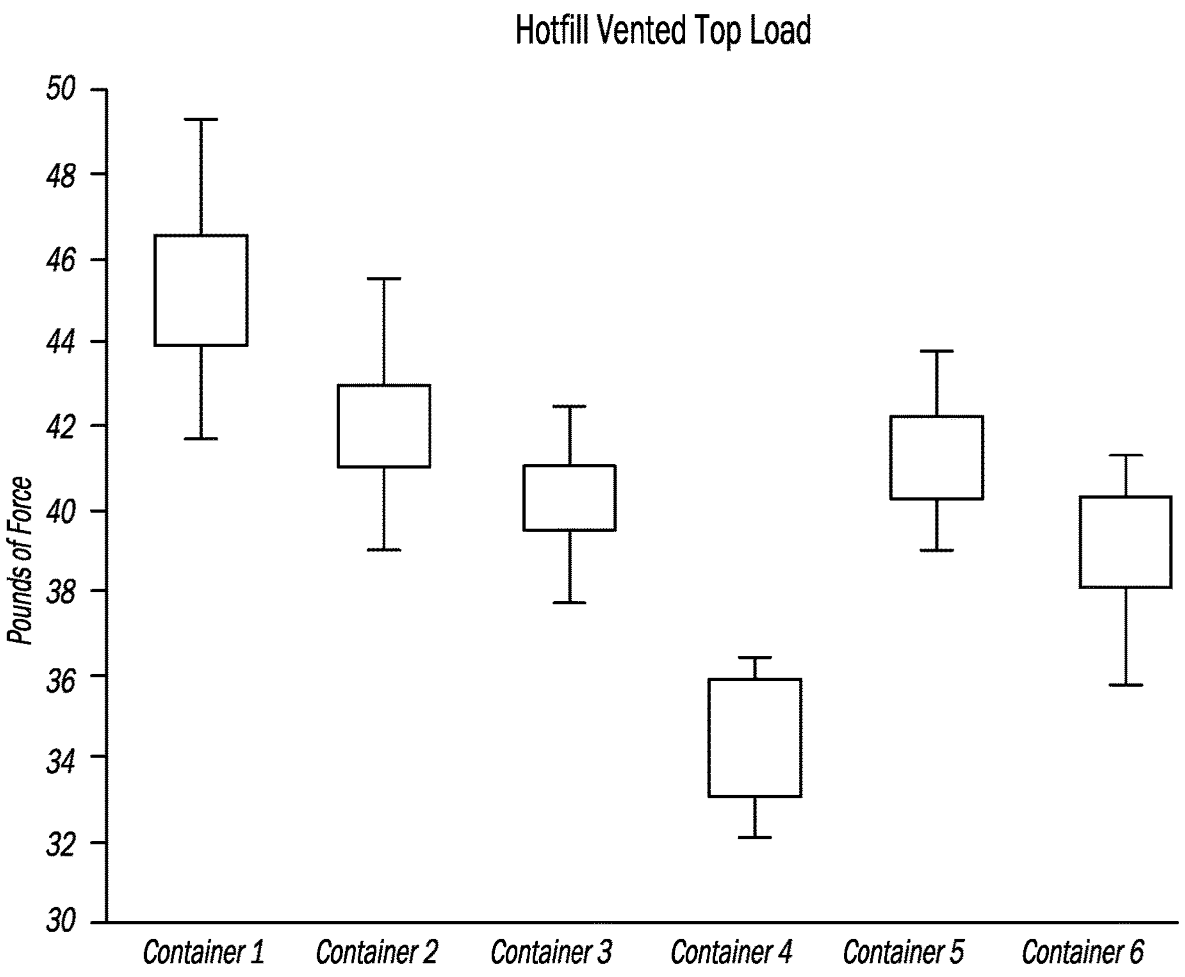
FIG. 4 illustrates performance of various containers during a hot fill vented top load test.

FIG. 4 illustrates an exemplary hotfill vented top load test. Vertical bottle samples were evaluated for compression resistance while hot filled, un capped and pre-cool, under a vented compression plate. A compression plate was lowered at a rate of five inches per minute, and results recorded as pounds of force being applied when the container failed. The test was performed with virgin PET with no rPET and Graphene to determine baseline performance. Graphene was also added at 0.25% and at 0.1% to the vPET with a slight decrease in performance. Then the virgin PET was mixed with 50% rPET causing a significant drop in top load performance. But by adding 0.25% and 0.1% graphene (as a percentage of the master batch) to the vPET/rPET, the performance was increased back to virgin PET (vPET) levels.

Figure 5:
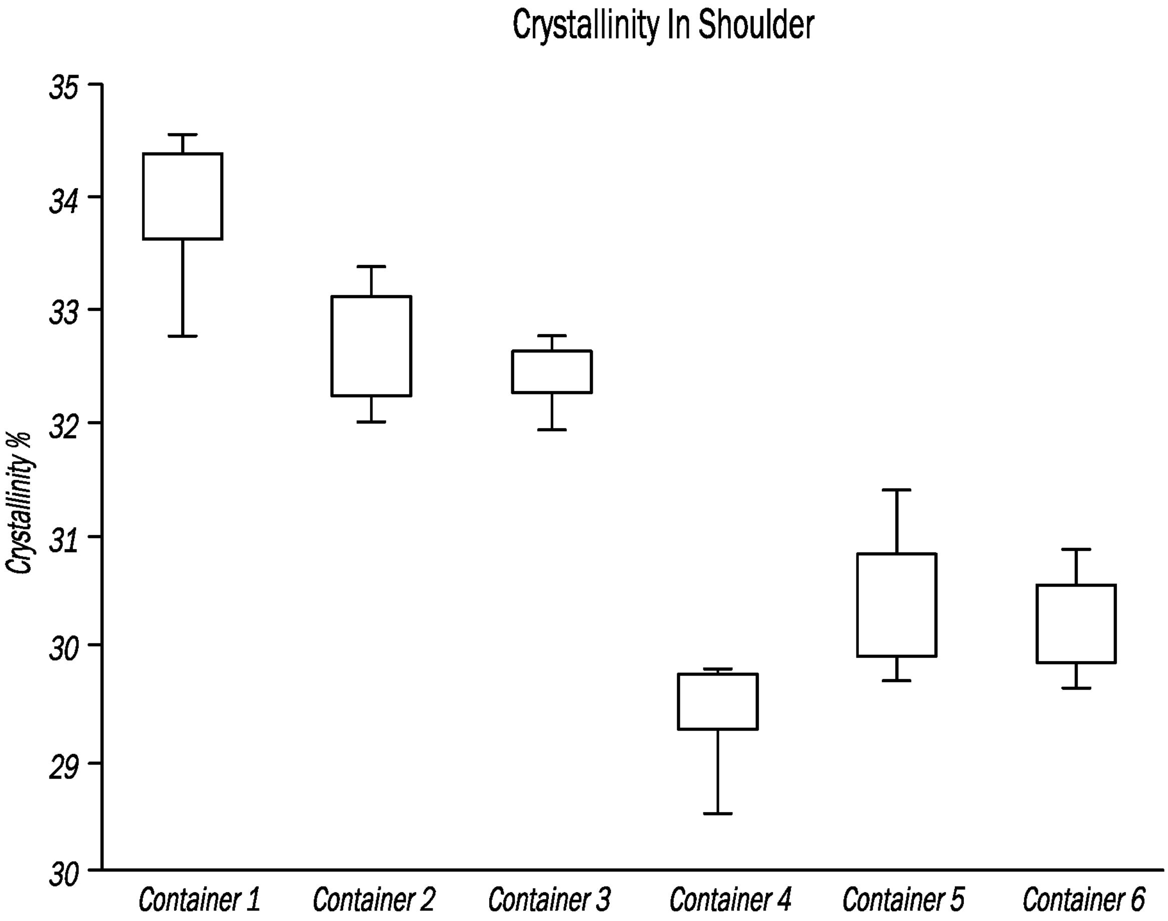
FIG. 5 illustrates shoulder crystallinity of various containers.

FIG. 5 illustrates an exemplary crystallinity at the shoulder 22 of various containers. The test was performed with virgin PET with no rPET and Graphene to determine baseline performance. Graphene was added at 0.25% and at 0.1% to the virgin PET with a slight decrease in crystallinity. Then the virgin PET was mixed with 50% rPET causing a significant drop in crystallinity below 30%, which is an industry standard for minimum crystallinity. But by adding 0.25% and 0.1% graphene (as a percentage of the master batch) to the vPET/rPET, the crystallinity was increased back to acceptable levels above 30%. One of the benefits of higher crystallinity is to improve the performance of the container base by reducing material movement (base drop or roll-out) when the container is filled with a hot liquid product causing thermal stress.

The base 26 of the container 10 is typically the hardest area to maintain a high level of stretch induced crystallinity. Due to the blow molding process, the base area is more amorphous. Therefore, it is advantageous to have a higher level of crystallinity to enhance resistance to thermal stress caused by hot-filling the container with liquid product. Lower crystallinity allows the base to be softened by the hot-fill process and to move down under the weight of the product in the container. This is typically called base roll out, base drop, or base sag.

Figure 6:
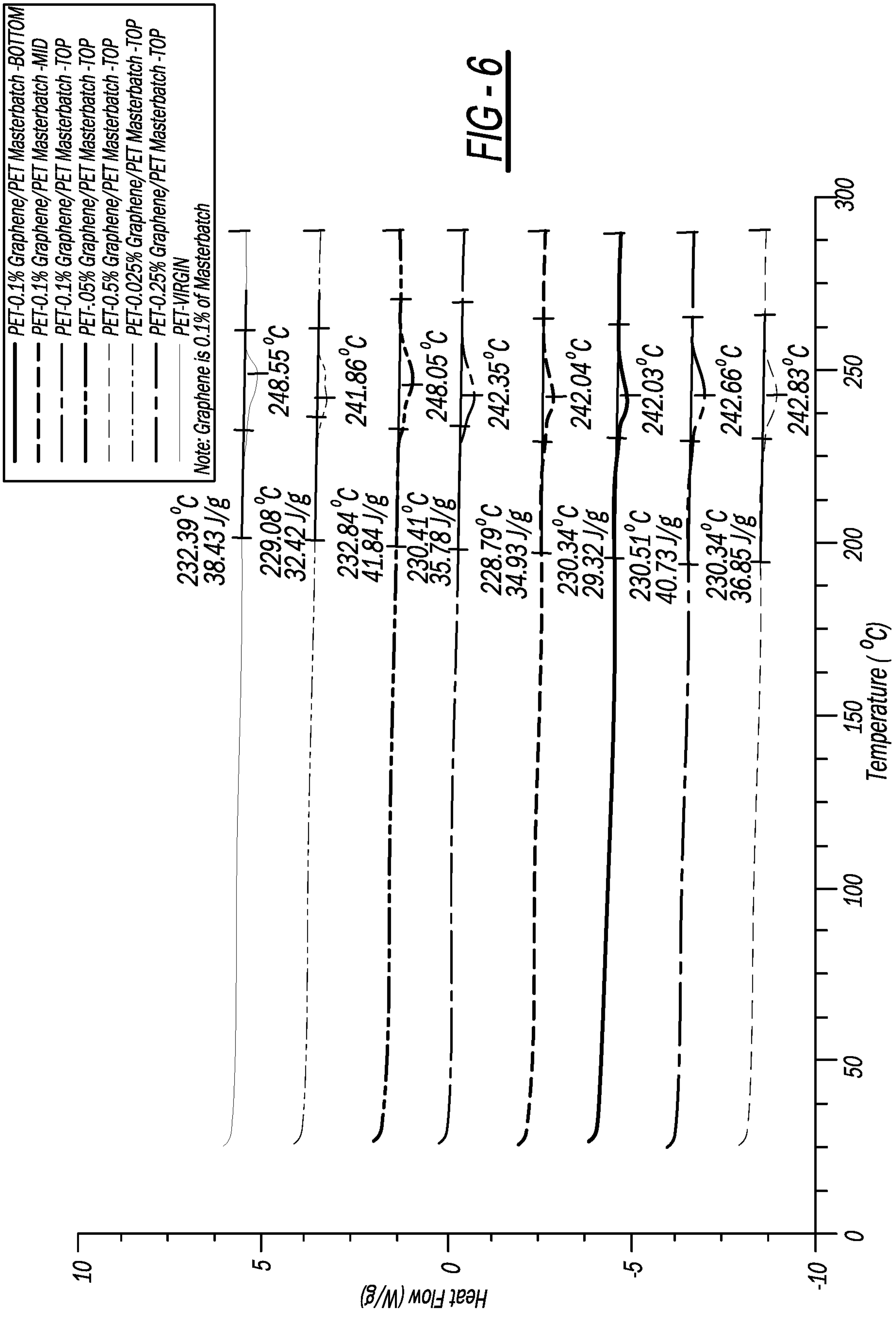
FIG. 6 illustrates melt temperature of various containers.

With reference to FIG. 6, by combining different materials together at different percentages, there is an effect on the melting temperature of the resin blend. This shift in melt temperature is compensated for in the preform injection molding process by adjusting the injection fill time. The melt temperature shift can also be used to test competitive containers for the presence of rPET and graphene.

Figure 7:
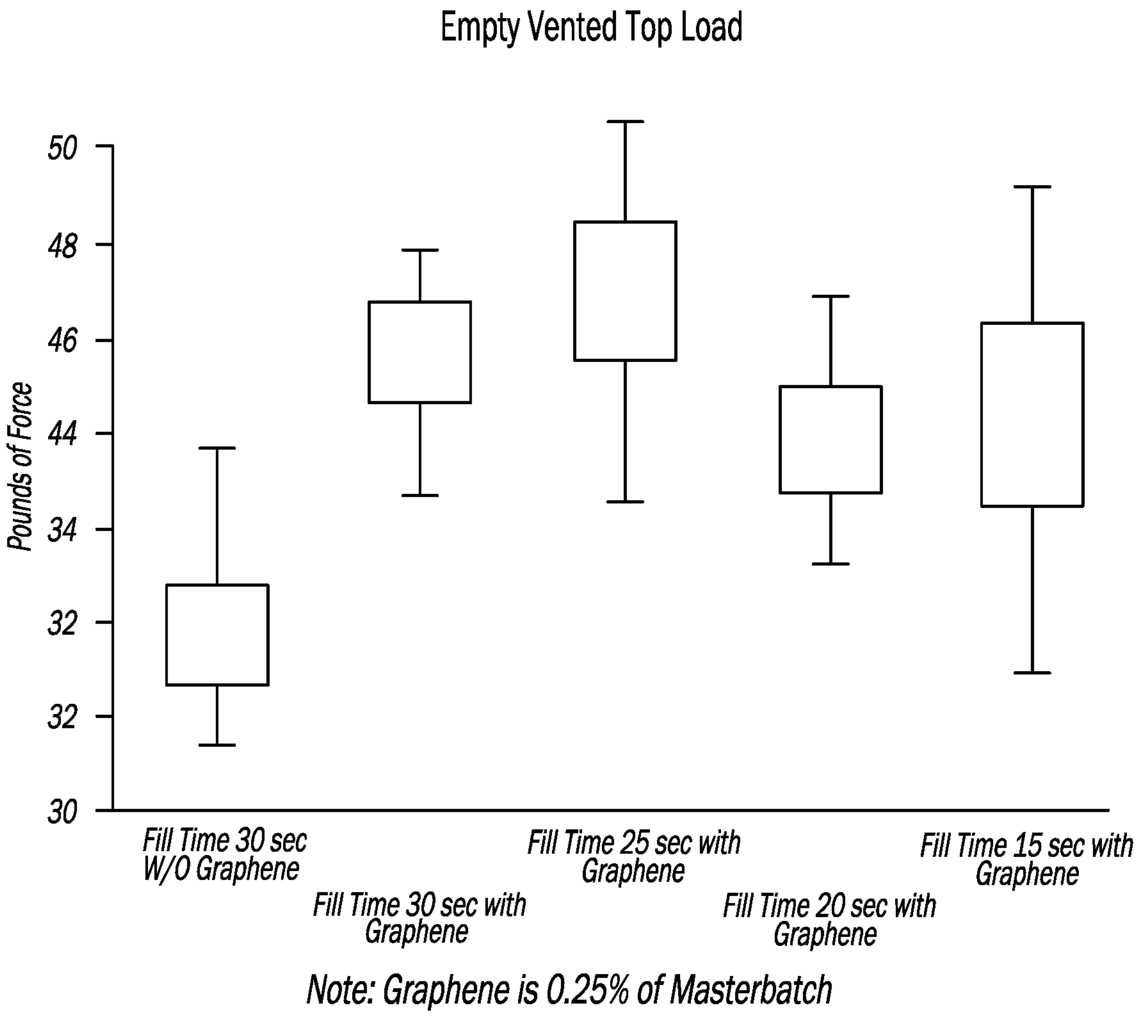
FIG. 7 illustrates performance of various containers during an empty vented top load test.
Figure 8:
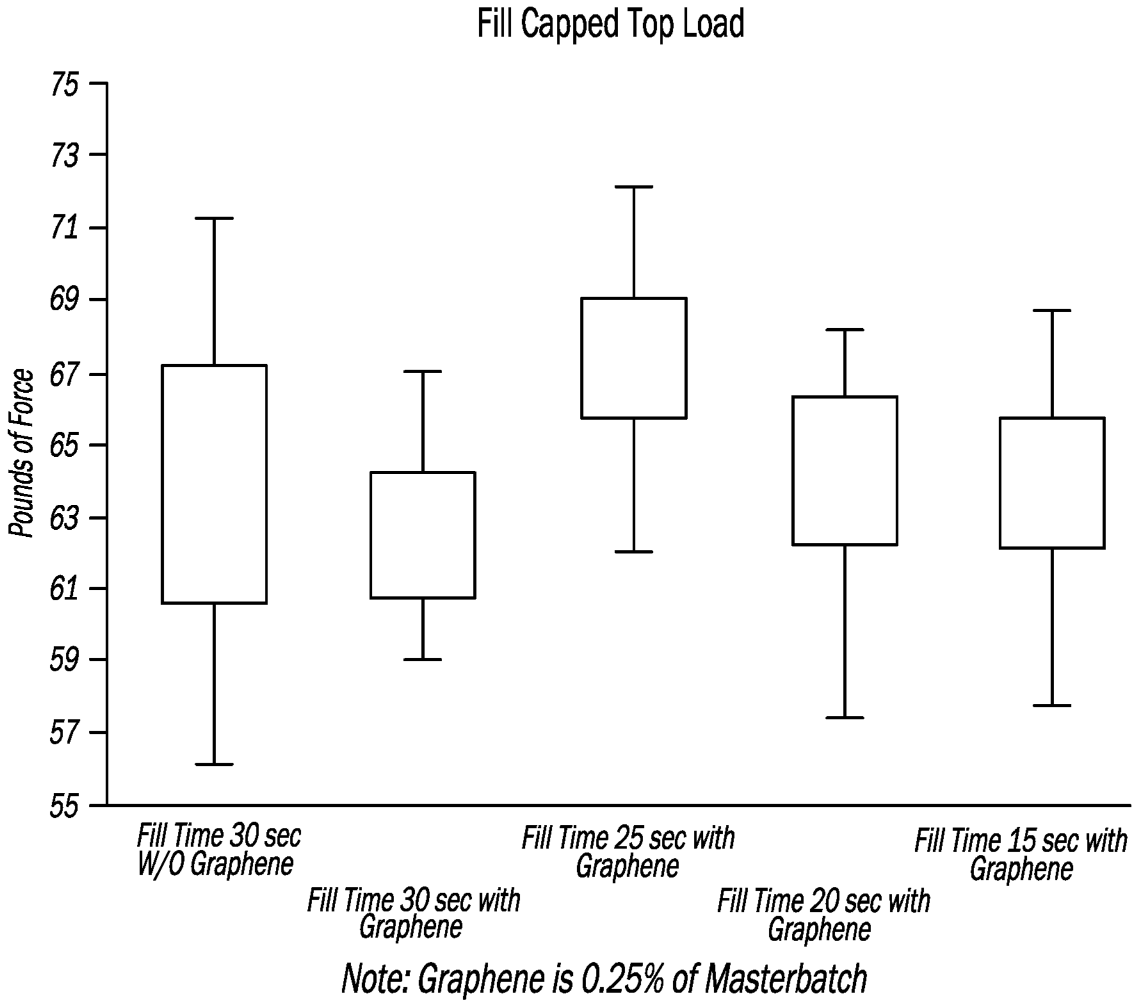
FIG. 8 illustrates performance of various containers during a fill capped top load test.

With reference to FIG. 7, to achieve the performance improvement of graphene in the final blow molded PET/rPET container 10, the preform injection molding process is optimized based on the amounts of each material in the resin blend. This is due to a shift in the melt temperate when materials are combined. The key injection molding parameter for optimizing graphene performance is the injection fill time. With reference to the empty vented top load test of FIG. 7 and the fill capped top load test of FIG. 8, 0.25% graphene (as a percentage of the master batch) was added to the vPET/rPET, and the injection fill time was varied from 15 to 30 seconds and compared to vPET without graphene. With respect to the present teachings, 25 second injection time is optimal and provides the highest top load performance in the final container.

The present disclosure thus advantageously uses graphene as an additive to PET containers to improve the performance of the container 10 when the PET also includes recycled PET (rPET/PCR/PIR). A mixture of PET, rPET, and graphene is injection molded into the preform 110, which is then blow molded into the container 10. In an effort to improve the sustainability of PET, rPET is mixed with the PET so that less pure PET is used and more recycled material is used. By adding rPET to PET, the mechanical properties of the PET are degraded and therefore exhibit various processing issues during injection molding of the preform and blow molding of the container, as well performance issues in the final container. It has been discovered that by also adding graphene to the vPET/rPET under certain preform injection molding conditions, there is an unexpected improvement in the mechanical performance of the container. Examples of improvement include the improved top load performance, increased crystallinity, and reduced base role out caused by thermal stress. One skilled in the art will appreciate that the present disclosure provides for numerous additional advantages and unexpected results as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A container for storing product therein, the container formed by injection stretch blow molding of a preform, the container comprising:
- recycled polyethylene terephthalate (PET); and
- graphene mixed with PET as a master batch;
- wherein:
  - the PET of the master batch is an antimony free and titanium catalyzed polymer;
  - the container has a crystallinity of at least 30%; and
  - the container is configured to withstand at least 40 pounds of top load force.

2. The container of claim 1, wherein at least 99.5% of the container consists of the recycled PET.

3. The container of claim 1, wherein the PET of the master batch is virgin or recycled PET.

4. The container of claim 1, wherein the master batch is 0.025%-0.5% of the container.

5. The container of claim 1, wherein the master batch is 0.1%-0.35% of the container.

6. The container of claim 1, wherein the graphene is 0.1% of the master batch.

7. The container of claim 1, wherein the graphene is 0.0025% to 0.05% of the container.

8. The container of claim 1, wherein the graphene is 0.01% to 0.035% of the container.

9. The container of claim 1, wherein the container has a crystallinity of at least 30%.

10. The container of claim 1, wherein the graphene has a bulk density of 0.03-0.1 g/cc.

11. The container of claim 1, wherein the graphene has an oxygen content of less than 5%.

12. The container of claim 1, wherein the graphene has a residual acid content of less than 0.5 wt. %.

13. The container of claim 1, further comprising virgin PET.

14. The container of claim 13, wherein up to 75% of the container consists of the virgin PET.

15. The container of claim 1, wherein the graphene is in the form of graphene nanoplatelets.

16. The container of claim 15, wherein the graphene nanoplatelets each have a surface area of 30 to 60 $m^2/g$, and an average particle diameter of one of 7, 10, and 25 microns.

17. The container of claim 15, wherein the graphene nanoplatelets each have a density of 2.2 $g/cm^3$.

18. The container of claim 15, wherein the graphene nanoplatelets each have a loss on ignition of greater than, or equal to, 99.0 wt. %.

19. The container of claim 15, wherein the graphene nanoplatelets each have a thermal conductivity of 3,000 W/m·K parallel to a surface and 6 W/m·K perpendicular to the surface.

20. The container of claim 15, wherein the graphene nanoplatelets each have a thermal expansion of $4\text{-}6*10^{-6}$ parallel to a surface and $0.5\text{-}1.0*10^{-6}$ perpendicular to the surface.

21. The container of claim 15, wherein the graphene nanoplatelets each have a tensile modulus of 1,000 MPa.

22. The container of claim 15, wherein the graphene nanoplatelets each have a tensile strength of 5 MPa.

23. The container of claim 15, wherein the graphene nanoplatelets each have an electrical conductivity of $10^7$ S/m parallel to a surface and $10^2$ perpendicular to the surface.

24. The container of claim 1, wherein the container is configured to withstand at least 60 lbs. of top load force when filled and capped before being disfigured.

25. The container of claim 1, wherein the container is configured to withstand at least 65 lbs. of top load force when filled and capped before being disfigured.

* * * * *